United States Patent
Battersby et al.

(10) Patent No.: US 10,242,323 B2
(45) Date of Patent: Mar. 26, 2019

(54) CUSTOMISABLE METHOD OF DATA FILTERING

(71) Applicant: Chatterbox Labs Limited, Berkshire (GB)

(72) Inventors: Stuart Battersby, Berkshire (GB); Danny Coleman, Berkshire (GB); Henrique Nunes, Berkshire (GB); Zheng Yuan, Berkshire (GB)

(73) Assignee: CHATTERBOX LABS LIMITED (GB)

( * ) Notice: Subject to any disclaimer, the term of this patent is extended or adjusted under 35 U.S.C. 154(b) by 786 days.

(21) Appl. No.: 14/856,770

(22) Filed: Sep. 17, 2015

(65) Prior Publication Data

US 2017/0083825 A1    Mar. 23, 2017

(51) Int. Cl.
  G06N 99/00    (2019.01)
(52) U.S. Cl.
  CPC .................. *G06N 99/005* (2013.01)
(58) Field of Classification Search
  None
  See application file for complete search history.

(56) References Cited

U.S. PATENT DOCUMENTS

| 2009/0125473 | A1* | 5/2009 | Amini | G06N 99/005 706/50 |
| 2013/0138641 | A1* | 5/2013 | Korolev | G06F 17/2785 707/730 |
| 2015/0139559 | A1* | 5/2015 | Smith | G06K 9/6215 382/225 |
| 2016/0132786 | A1* | 5/2016 | Balan | G06N 99/005 706/12 |
| 2016/0162807 | A1* | 6/2016 | Smailagic | G06N 99/005 706/12 |
| 2016/0180245 | A1* | 6/2016 | Tereshkov | G06F 17/30557 706/12 |

OTHER PUBLICATIONS

Go, A; Bhayani, R. and Huang, L., "Twitter Sentiment Classification Using Distant Supervision," Research; Stanford University, Standford, CA, 2009, pp. 1-6.
Hsu, C. et al., "A Practical Guide to Support Vector Classification," http://www.csie.ntu.edu.tw/-cjlin, Apr. 15, 2010, pp. 1-16.
Purver, M. and Batterby, S., "Experimenting with Distant Supervision for Emotion Classification," EACL '12 Proceedings of the 13th Conference of the European Chapter of the Association for Computational Linguistics, 2012, 10 pages.
Yuan, Z. and Purver, M., "Predicting Emotion Labels for Chinese Microblog Texts," Proceedings of the ECML-PKDD 2012 Workshop on Sentiment Discovery from Affective Data (SDAD, 2012), 2012, pp. 40-47.

* cited by examiner

*Primary Examiner* — Alan Chen
(74) *Attorney, Agent, or Firm* — McAndrews, Held & Malloy, Ltd.

(57) ABSTRACT

There is provided a device and method for classifying data. The device comprises a controller configured to receive data, classify the data into a first class or a second class using a first machine learning classifier, and if the data is classified into the second class, classify the data into one of a third class and a fourth class using a second machine learning classifier. The first and second machine learning classifiers have their own predefined sets of rules for classifying data.

21 Claims, 6 Drawing Sheets

CUSTOMISABLE METHOD OF DATA FILTERING

FIELD OF THE INVENTION

Embodiments of the invention relate generally to a device and method for classifying data.

BACKGROUND

Sentiment analysis and emotion classification are natural language processing applications for determining from text, the attitude or emotion of the author of the text. Sentiment analysis determines whether the author is feeling positive or negative towards the subject of the message. Emotion classification determines a specific emotion displayed by the author (such as "happy", "sad", "anger", etc.). These methods are very useful when it comes to analysing large amounts of data (such as messages posted on social networks) to determine public sentiment towards a given product or idea.

Each method classifies input text based on the confidence that it falls within a given class (e.g. "happy", "sad", etc.) of a predefined number of classes. The text is classified into the class which it is most likely to fall within according to a pre-trained machine learning classifier or a rules based classifier. The machine learning classifier is pre-trained with training data via machine learning in order to pinpoint the patterns for classifying text. The training data is often manually labelled so that, during training, it is known which class each part of the training data falls within. Alternatively, distant supervision may also be to automatically assign training data to various classes based on conventional markers.

Before text can be classified, it must first be tokenised. Tokenisation breaks up the input text into a number of tokens to be processed by the classifier. Tokens may be assigned on the word level or the character level, that is, text may be split up into individual words or characters. Generally, tokens may be phonemes, syllables, letters, words or base pairs depending on the data being classified.

Tokens can be combined into a sequence of tokens to form n-grams. The n-grams are then input into the classifier for sorting into a target class.

Go, A.; Bhayani, R. & Huang, L. (2009), 'Twitter Sentiment Classification using Distant Supervision', Processing, 1-6, the entire disclosure of which is incorporated herein by reference, describes the use of various machine learning algorithms (naïve Bayes, maximum entropy and support vector machines (SVMs)) to classify Twitter™ messages via sentiment analysis. Emoticons are used as noisy labels indicating positive or negative sentiment. Input text is tokenised using a combination of unigrams and bigrams on the word level.

Purver, M. & Battersby, S. (2012), 'Experimenting with Distant Supervision for Emotion Classification', EACL '12 Proceedings of the 13th Conference of the European Chapter of the Association for Computational Linguistics, 482-491, the entire disclosure of which is incorporated herein by reference, describes using conventional markers of emotional content within the text being classified as a surrogate for explicit labels to avoid the need to label training data manually. Twitter™ messages are tokenised using unigrams at the word level and classified using a support vector machine (SVM) into one of six emotions (happy, sad, anger, fear, surprise and disgust).

Yuan, Z. and Purver, M. (2012), 'Predicting Emotion Labels for Chinese Microblog Texts', Proceedings of the ECML-PKDD 2012 Workshop on Sentiment Discovery from Affective Data (SDAD 2012), 40-47, the entire disclosure of which is incorporated herein by reference, describes detecting emotion in Chinese microblog posts by assigning text to one of seven emotions via support vector machine classification. Tokenisation is performed at the character level.

It can be useful to be able adjust the filtering based on an end user's needs, for instance, to let more data be assigned to a given categories. Whilst the above methods are effective at classifying data, they operate under a predefined set of rules and thresholds. Should the user wish to adapt the classifier (for instance, to be more sensitive to a given class), then the classifier would need to be completely retrained. Accordingly, there is a need for a more customisable means of data filtering.

SUMMARY OF INVENTION

According to a first aspect of the invention there is provided a device for classifying data, the device comprising a controller configured to receive data, classify the data into a first class or a second class using a first machine learning classifier, and if the data is classified into the second class, classify the data into one of a third class and a fourth class using a second machine learning classifier. The first and second machine learning classifiers have their own predefined sets of rules for classifying data.

By utilising two independent classifiers, the device is able to more effectively classify data by applying different classification rules or methods for each stage. In addition, the classification may be easily altered according to the user's specific use requirements without requiring the classifiers to be retrained. The device may implement only two classifiers or may implement more than two classifiers, provided that the output of one classifier is used as the input for a subsequent classifier.

The data may be text data, speech data, linguistic data or any other form of data for which the machine learning classifiers may be trained. Each machine learning classifier may utilise a statistical model or some other statistical function which maps input data to a class according to pretrained rules. These pretrained rules may be stored by the device in memory. Each class relates to a group of data with similar characteristics or traits, such as linguistic traits.

Each machine learning classifier may be a support vector machine, a naïve Bayes classifier, a neural network a maximum entropy classifier, and the first and second machine learning classifiers may implement different classification methods. For instance, the first machine learning classifier may utilise a support vector machine whilst the second machine learning classifier may utilise neural networks. The controller may be further configured to, once the data has been classified, output the data along with an indication of the associated class. Such an output may be an output to memory, an output to a display, an output via a network or any other form of output.

In one embodiment, the first and second machine learning classifiers are binary classifiers. That is, the first machine learning classifier classifies data into one of only the first and second classes, and the second machine learning classifier classifies data into one of only the third and fourth classes. Utilising binary classifiers ensures that each classification step may be more effectively adjusted based on the user's preference. Whilst multi-class classifiers may be utilised, any thresholds applied would only be able to affect the strictness of classification into one of the many available classes for each machine learning classifier and no control would be offered for the division between the remaining classes.

In one embodiment, the first and second machine learning classifiers classify the data based on traits of the data and the second machine learning classifier does not consider some or all of the traits considered by the first machine learning classifier. This provides a more efficient means of classifying data as each classifier need only consider the traits or features which are immediately relevant to the classification at hand. The data may contain linguistic data, such as messages, and the classifiers may classify based on linguistic traits.

In one embodiment, the first and second machine learning classifiers utilise different methods of classifying the data. Examples of such methods include support vector machine classification, naïve Bayes classification, neural network classification or a maximum entropy classification. By utilising different methods of classification, each classification stage may be optimised for the given classification task to improve accuracy.

In one embodiment, classifying the data into the first class or the second class using the first machine learning classifier comprises determining the confidence that the data belongs to the first class based on the set of rules of the first machine learning classifier. If the confidence that the data belongs to the first class falls within a first range, the data is classified into the first class. If the confidence that the data belongs to the first class does not fall within the first range, the data is classified into the second class. In addition, classifying the data into the third class or the fourth class using the second machine learning classifier comprises determining the confidence that the data belongs to the second class based on the set of rules of the second machine learning classifier. If the confidence that the data belongs to the third class falls within a second range, the data is classified into the third class. If the confidence that the data belongs to the third class does not fall within the second range, the data is classified into the fourth class.

Accordingly, the strength of the filtering at each stage may be customised based on the user's requirements by varying the confidence ranges. The first and second ranges may be defined according to thresholds. These confidence thresholds may be applied to any value of confidence or may be applied to an absolute value of the confidence to account for negative confidence which can arise from classifying into one of the two respective classes.

The range may be between a negative confidence threshold and a positive confidence threshold, for instance, between −0.8 and +0.8. The first and second ranges may each include multiple ranges. For instance, the first or second ranges may include a range of greater than an upper threshold (between the upper threshold and infinity), and a second range of less than a lower threshold (between the lower threshold and negative infinity), wherein the second threshold is less than the first threshold. This allows the thresholding of a minimum absolute confidence to be applied to negative confidences as well as positive confidences. For instance, the upper threshold may be +0.8 and the lower threshold may be −0.8. This is analogous to applying a threshold of +0.8 to the absolute value of the confidence. In addition, whilst the above embodiments classify into one class if the confidence of the data belonging to this one class falls within a range, it will be appreciated that this is analogous to classifying into this one class if the confidence of the data belonging to the other class falls within the compliment of this range.

In one embodiment, the controller is further configured to alter one or more of the first and second thresholds and classify further data according to the updated one or more of the first and second thresholds. This allows the strength of the filtering at each stage to be varied to tune the system or to adapt it to an alternative use scenario without requiring the classifiers to be retrained. An input of new the threshold value(s) may be received by the controller and then these values may be applied to further classification tasks. The controller may be configured to display a graphical user interface (GUI) to allow the user to view the current thresholds and input updated thresholds. In addition, the device may comprise memory configured to store predefined sets of thresholds for specific use cases (for instance, a conservative setting with high thresholds, a neutral setting with medium thresholds and a liberal setting with low thresholds). The further data may be new data received by the device or may be the original data reinput for reclassification according to the updated thresholds.

In one embodiment, the controller is further configured to output one or more of the determined confidences. This allows the user to view how strongly associated the data is to any of the classes (and not just the class into which the data is finally classified). This may help the user to determine appropriate updated thresholds to tune the system. It is particularly advantageous to output the confidences for the classes into which the data was not classified, as these may not be immediately apparent to the user.

The device may be configured to cause a display to display one or more of the determined confidences. Alternatively, the device may be configured to store one or more of the confidences in memory, or otherwise output one or more of the confidences. The device may be configured to output a confidence value after the respective classification step or output the one or more confidence values after the data has been assigned a final class.

In one embodiment, the controller is further configured to: prior to classifying the data into the first class or the second class using the first machine learning classifier, prepare the data for input into the first machine learning classifier according to a first method; and, prior to classifying the data into the third class or the fourth class using the second machine learning classifier, prepare the data for input into the second machine learning classifier according to a second method. The first and second methods of preparing the data are different. This allows the format of the data to be customised for each classifier to improve accuracy (for instance, one classifier may operate most effectively using bigrams whilst a second classifier may operative most effectively using trigrams).

In one embodiment, the first and second methods of preparing the data comprise different methods of tokenising the data. This may include different methods of adding flags or labels to the data to label context (such as linguistic context) or to reduce the number of features.

The first and second methods of preparing the data may comprise different methods of forming n-grams from the data. These n-grams may be formed from the same set of tokens or from tokens obtained from different tokenisation methods.

In a further embodiment, the first and second methods of preparing the data comprise forming respective feature vectors from the data and the first and second methods comprise different methods of vectorising the data.

Accordingly, the data may be tokenised at each classification stage according to different tokenisation methods, or the same set of tokens may be shared by the classifiers. Such tokenisation may, for instance, be at a character level or a word level and may implement contextual flags. Equally, a new set of n-grams may be formed for each classifier or the same set of n-grams may be shared by the classifiers. Such n-grams may be, for instance, unigrams, bigrams etc. and any combination of such n-grams. Furthermore, alternative methods of producing feature vectors from the data may be implemented for each classifier or the same method may be shared by the classifiers.

According to one embodiment, the first or second machine learning classifiers classify the data based on whether the data relates to a purchase, relates to advertising or corporate messaging, relates to a purchase which has already occurred, relates to interest in a product, relates to consideration of a product for purchase or relates to clear intent to purchase a product.

According to one embodiment there is provided a device for classifying messages, the device comprising a controller configured to receive a message and classify the message as being either related or unrelated to a purchase using a first machine learning classifier. The controller is further configured to, if the message is classified as being related to a purchase, classify the message as being either related or unrelated to advertising and corporate messaging using a second machine learning classifier. The controller is further configured to, if the message is classified as being unrelated to advertising and corporate messaging, classify the message as being either related or unrelated to a purchase which has already occurred using a third machine learning classifier. The controller is further configured to, if the message is classified as being unrelated to a purchase that has already occurred, classify the message as being related to either interest in a product or intent to purchase a product using a fourth machine learning classifier. The controller is further configured to, if the message is classified as being related to intent to purchase a product, classify the message as being either related to consideration of a product for purchase or to clear intent to purchase a product using a fifth machine learning classifier.

The first and second machine learning classifiers have their own predefined sets of rules for classifying data.

According to a second aspect of the invention there is provided method of classifying data, the method being implemented by a device comprising a controller. The method comprises the controller: receiving data; classifying the data into a first class or a second class using a first machine learning classifier; and if the data is classified into the second class, classifying the data into one of a third class and a fourth class using a second machine learning classifier. The first and second machine learning classifiers have their own predefined sets of rules for classifying data.

In one embodiment, the first and second machine learning classifiers are binary classifiers.

In one embodiment, the first and second machine learning classifiers classify the data based on traits of the data and the second machine learning classifier does not consider some or all of the traits considered by the first machine learning classifier.

In one embodiment, the first and second machine learning classifiers utilise different methods of classifying the data.

In one embodiment, classifying the data into the first class or the second class using the first machine learning classifier comprises determining a confidence that the data belongs to the first class based on the set of rules of the first machine learning classifier. If the confidence that the data belongs to the first class exceeds a first threshold, the data is classified into the first class. If the confidence that the data belongs to the first class does not exceed the first threshold, the data is classified into the second class. In addition, classifying the data into the third class or the fourth class using the second machine learning classifier comprises determining a confidence that the data belongs to the second class based on the set of rules of the second machine learning classifier. If the confidence that the data belongs to the third class exceeds a second threshold, the data is classified into the third class. If the confidence that the data belongs to the third class does not exceed the second threshold, the data is classified into the fourth class.

In one embodiment, the method further comprises altering one or more of the first and second thresholds and classifying further data according to the updated one or more of the first and second thresholds.

In one embodiment, the method further comprises outputting one or more of the determined confidences.

In one embodiment, the method further comprises: prior to classifying the data into the first class or the second class using the first machine learning classifier, preparing the data for input into the first machine learning classifier according to a first method; and prior to classifying the data into the third class or the fourth class using the second machine learning classifier, preparing the data for input into the second machine learning classifier according to a second method. The first and second methods are different.

In one embodiment, the first and second methods comprise different methods of tokenising the data.

In one embodiment, the first and second methods comprise different methods of forming n-grams from the data.

In one embodiment, the first and second methods comprise forming respective feature vectors from the data and the first and second methods comprise different methods of vectorising the data.

According to one embodiment, the first or second machine learning classifiers classify the data based on whether the data relates to a purchase, relates to advertising or corporate messaging, relates to a purchase which has already occurred, relates to interest in a product, relates to consideration of a product for purchase or relates to clear intent to purchase a product.

According to one embodiment there is provided a method for classifying messages, the method being implemented in a controller. The method comprises receiving a message and classifying the message as being either related or unrelated to a purchase using a first machine learning classifier. The method further comprises, if the message is classified as being related to a purchase, classifying the message as being either related or unrelated to advertising and corporate messaging using a second machine learning classifier. The method further comprises, if the message is classified as being unrelated to advertising and corporate messaging, classifying the message as being either related or unrelated to a purchase which has already occurred using a third machine learning classifier. The method further comprises, if the message is classified as being unrelated to a purchase that has already occurred, classifying the message as being related to either interest in a product or intent to purchase a product using a fourth machine learning classifier. The method further comprises, if the message is classified as being related to intent to purchase a product, classifying the message as being either related to consideration of a product for purchase or to clear intent to purchase a product using a fifth machine learning classifier.

According to one embodiment there is provided a non-transitory computer readable medium containing program instructions for causing a computer to perform any of the above methods. Accordingly, software may be stored in non-volatile memory, such as a CD-ROM, DVD or flash memory, may be read by a computer to cause the computer to classify data according to the methods described herein.

BRIEF DESCRIPTION OF THE DRAWINGS

Embodiments of the present invention will be understood and appreciated more fully from the following detailed description, made by way of example only and taken in conjunction with drawings in which.

DETAILED DESCRIPTION

Embodiments of the invention provide a means of classifying data wherein multiple binary classifiers are used in series to provide a more flexible and customisable means of filtering the data. This is achieved by chaining together multiple binary classifiers. Previous methods of classifying involve a single pre-trained classifier. In such known methods it is not possible to change the sensitivity to a given class without retraining. The present method involves multiple independent decisions. This allows each decision to be fine-tuned based on the user's needs.

A binary classifier is a process which classifies or sorts data into one of two classes or categories based on a set of rules. This is in contrast to a multiclass classifier which sorts data into more than two classes. The classifier may be a statistical model or some other mathematical function which maps input data to a category. The classification rules are usually trained using a machine learning processes and a set of labelled training data. These rules are used to determine the confidence that the data belongs to each of the classes and, if the confidence for a class is greater than a threshold confidence, the data is classified as belonging to that class.

The overall structure of a method of classifying according to an embodiment will be described before the individual classification steps are described in more detail.

Figure 1:
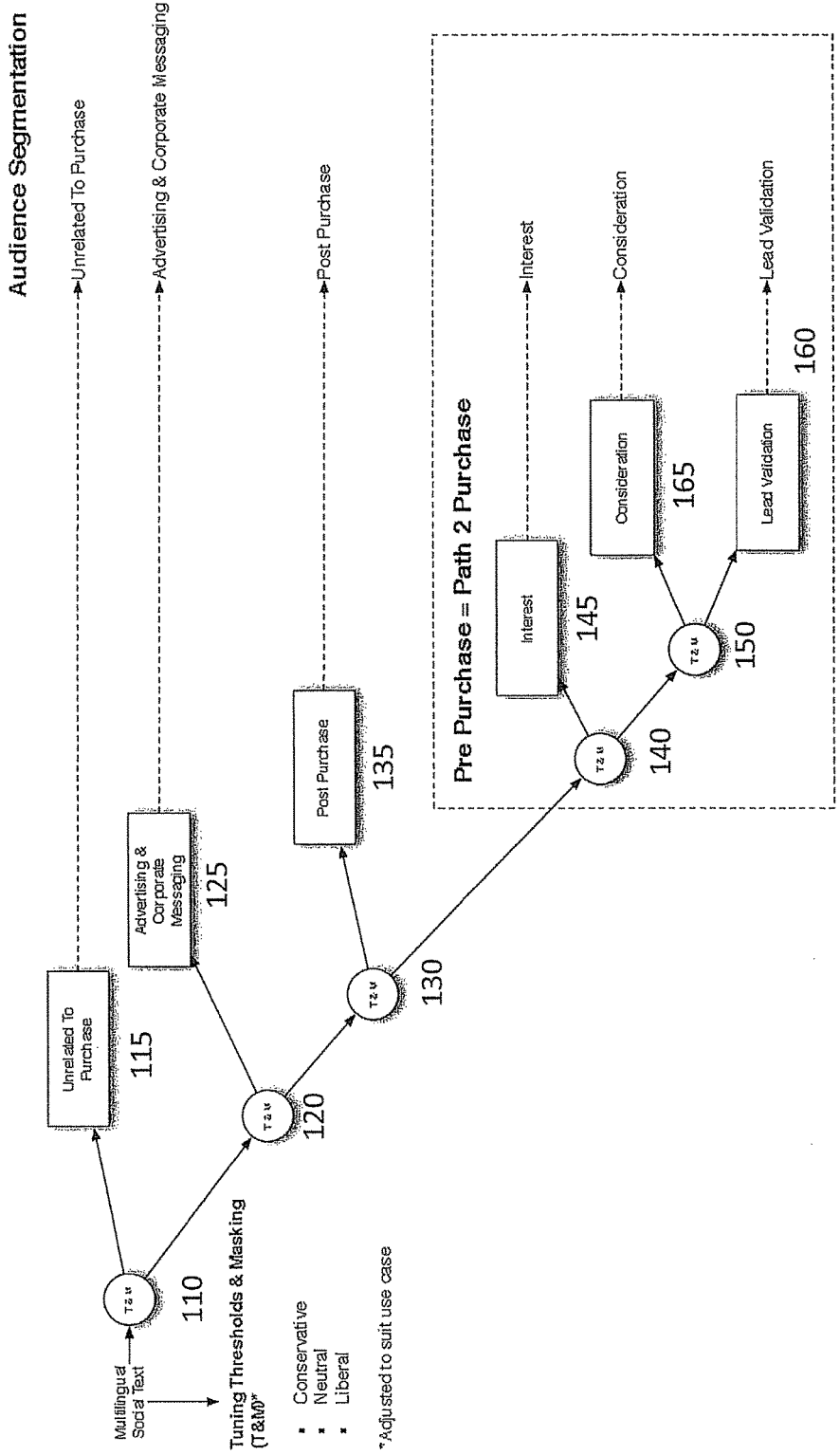
FIG. 1 shows a decision tree structure according to an embodiment of the invention.

FIG. 1 shows a decision tree structure according to an embodiment of the invention. The decision tree 100 comprises a number of classifying steps in which tuning threshold and masking (T&M) are applied. A mask is a set of thresholds applied across the decision tree. Each threshold provides a limit for the confidence of a respective classification step. Should the classification not satisfy this limit then the data is reclassified to the alternative class for that classification step. The thresholds can be predefined based on a given business scenario which may be either selected by the user or stored as default. In addition, these thresholds may be set by the user and varied by the user according to their specific requirements.

The embodiment shown in FIG. 1 relates to the classification of multilingual social messages into various classes relating to the path to purchase. Such messages may be text only, or text mixed with symbols, emoji or emoticons. Text may be in any single language (or character set) or in a variety of languages, such languages including informal, niche and slang language, provided that the system has been trained appropriately.

By passing messages through the decision tree, each message is classified into one of six classes (unrelated to purchase, advertising and corporate messaging, post purchase, interest, consideration, and lead validation).

Each classification step 110, 120, 130, 140, 150 includes a binary classifier, so that each decision step provides either a positive output (based on a determination that the relevant classification criteria are met) that moves the message to be classified to the next decision step or a negative output (based on a determination that the relevant classification criteria are not met). That said, each classifier may comprise an adjustable threshold that can be easily adapted to the given task to tune the filtering without requiring the classifiers to be retrained.

A message is initially input into the first classification step 110 which determines whether the message relates to a purchase. The classification is based on a statistical analysis of the message. A confidence of the message belonging to the class "related to purchase" is calculated. If the absolute confidence value that the message relates to a purchase is less than or equal to a first threshold then it is classified as "unrelated to purchase" 115. This helps to filter out any data which are not related to purchases and therefore offer no insight into a potential consumer purchase. These messages may, however, be useful for social insights (e.g. "so this summer should be fun, I get to shoot a classic 59 corvette, and a beautiful audi r8"). If the absolute confidence value of the message being related to a purchase is above the first threshold then the message is deemed to relate to a purchase and is passed on to the next classification step 120.

The second classification step 120 determines whether the message relates to advertising or corporate messaging. The confidence of the message relating to advertising or corporate messaging is calculated and, if the absolute confidence value is greater than or equal to a second threshold, then the message is classified as "advertising & corporate messaging" 125. This further removes any message data which doesn't relate to consumers. These messages may typically include advertising, news, corporate messaging, spam, and shared sponsored blogging (e.g. ""#newcarincentives new car finance—1.9% financing on a new audi a5 . . . buy a new audi a5 below invoice price an . . . http://t.co/f2fvzenb5q"). If the absolute confidence value of the message relating to advertising or corporate messaging is below the second threshold then the message is deemed to not relate to advertising or corporate messaging and is passed on to the next classification step 130.

The third classification step 130 determines whether the message relates to a previously purchased product or service. The confidence of the message relating to a previously purchased product or service is calculated and if the absolute confidence value is greater than or equal to a third threshold then the message is classified as "post purchase" 135. This may be a recommendation or a referral, or may relate to customer service, crisis management, brand loyalty, advocacy or purchase retention. Examples of post-purchase messages are: "@verizon has the worst customer service.", "i got my first car today. audi a4 1.8!!! so stoked!", "getting my audi serviced, no one told me that fancy cars have fancy service prices! ahhhhh". This can allow cases to be funnelled in real time to customer care specialists. If the absolute confidence value of the message relating to a previously purchased product or service is less than a third threshold then the message is deemed to relate to something pre-purchase and is passed on to the next classification step 140. Messages passed to the fourth classification step 140 display an author's interest in a product or intent to purchase a product, that is, they highlight a potential purchase that may happen in the future.

The fourth classification step 140 determines whether the message relates to interest in a product. The confidence of the message relating to interest in a product is calculated and if the absolute confidence value is greater than or equal to a fourth threshold then the message is classified as "interest" 145. Such messages often display the author's desire or need for a product or ask questions about the product (e.g. "i want the new audi s5" or "my dream car is a white volkswagen jetta."). This can allow the provision of two way social engagement and customer contact centre interaction as possible execution mechanisms (the actions taken by the user in response to the classification). If the absolute confidence value of the message relating to interest in a product is less than the fourth threshold then the message is deemed to relate to more than mere interest in a product and is passed on to the next classification step 150.

The fifth classification step 150 determines whether the message relates to consideration of a product. This means that the author is not yet convinced of a purchase but is considering purchasing the product. The confidence of the message relating to consideration of a product is calculated and if the absolute confidence value is greater than or equal to a fifth threshold then the message is classified as "consideration" 155. Such messages usually indicate that the author is thinking about a purchase and may be commenting on the price of a product, comparing products or asking for recommendations (e.g. ""audi a3 or a5 next year?! #decisions #newcar or "i * thnk i might take advantage of these sales at hh gregg & buy a tablet."). This can allow for real time targeted social advertising to consumers as they are considering a purchase as a possible execution mechanism.

If the absolute confidence value of the message relating to consideration of a product is less than the fifth threshold then the message is classified as "lead validation" 160. These messages display the author's clear intent to purchase a product (e.g. "ready to buy this audi this week #a4" or "i'm kinda chilly. i guess i'll have to buy that new pullover @lululemon"). This can help to process real-time purchases into customer relationship management as a possible execution mechanism.

By implementing a decision tree with a chain of binary classifiers instead of including a single classifier with more than two classes, the filtering may be easily adjusted in real time by a user without requiring the classifier(s) to be retrained. The thresholds for each classification step may be varied to provide more conservative or more liberal filtering based on the user's needs. For instance, a social advertiser may apply more liberal settings to let more messages filter towards the bottom of the tree. Conversely, a customer relationship management implementation may apply more conservative settings to ensure that only the most relevant messages are filtered towards the bottom of the tree.

Each confidence value is determined from −1 to +1, with −1 meaning a 100% confidence of belonging to one class, and +1 meaning a 100% confidence of the data belonging to the other class. For this reason, the absolute value of the confidence value is used, to remove any erroneous reclassifications based on negative confidence values.

The specific embodiment of FIG. 1 classifies in real time a stream of social media data to pinpoint buyers on their path to purchase. Having said this, the decision tree structure of FIG. 1 may be applied to a variety of data types and a variety of classifiers, which need not be limited to purchase intent. Accordingly, the decision tree structure described herein provides a general framework for classifying data.

Figure 2:
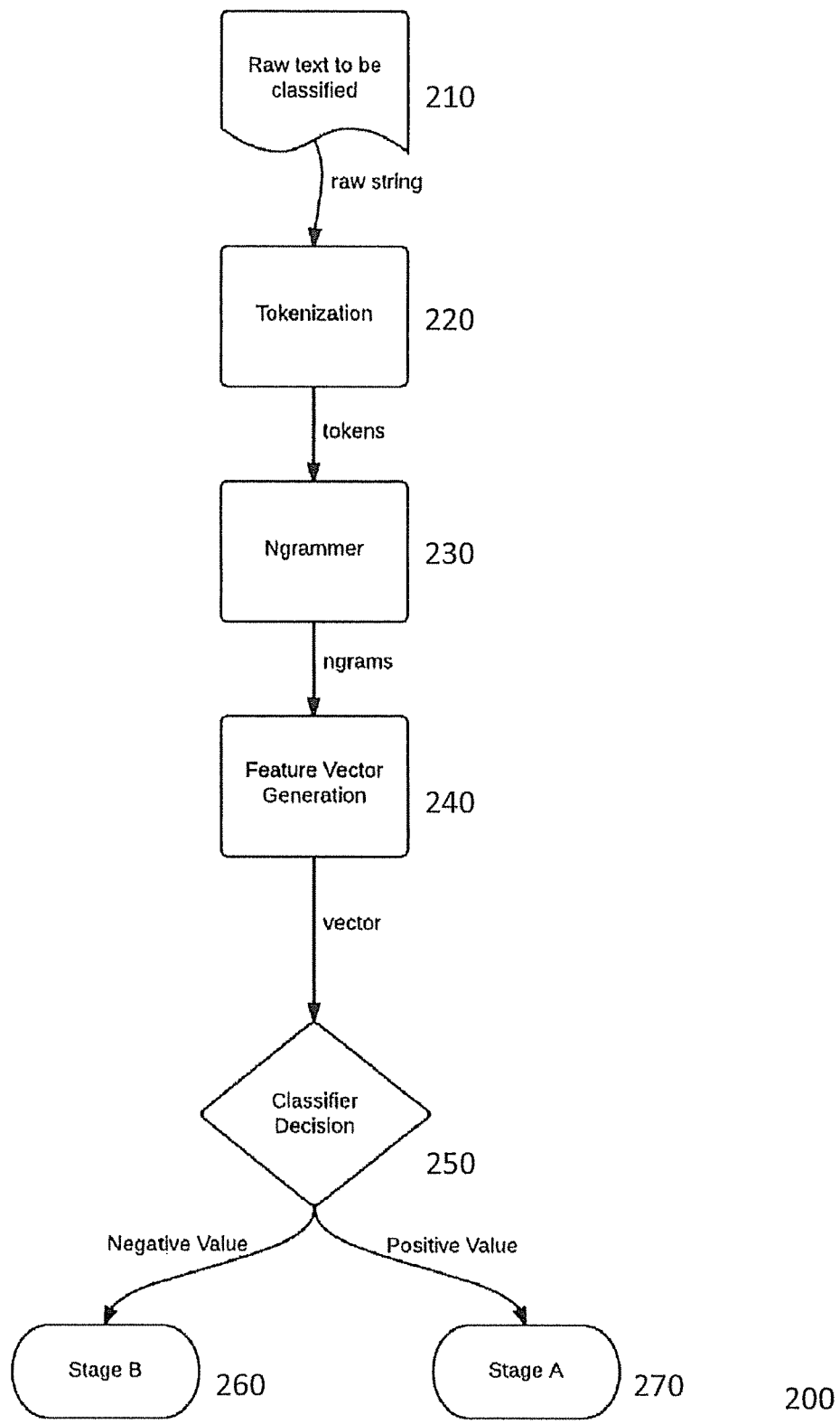
FIG. 2 shows the process for a single classifier.

FIG. 2 shows a process performed in a single classification step 200, that is, in one of the steps 110, 120, 130, 140 and 150 shown in FIG. 1. In the present embodiment, each classification step 200 comprises tokenisation 220 and n-gram formation 230 to bring the message into a format suitable for classification.

Raw text to be classified is initially input 210. For example, the raw text may be "audi, a3 or a5 next year?! #decisions #newcar". The raw string of data is then tokenised 220 to split the data into a number of tokens. Each token is a unit to be processed. For instance, text data may be tokenised into linguistic units on a word or character level. That is, the text data may be broken up into individual words or individual characters. In the present embodiment, the raw text is tokenised on a word level for English to split the raw data into individual words and the character level for Mandarin Chinese to split the raw data into individual characters. A description of tokenisation can be found in "The Art of Tokenisation" by Craig Trim (accessible at https://www.ibm.com/developerworks/community/blogs/nlp/entry/tokenization?lang=en) the disclosure of which is incorporated herein by reference.

In one embodiment, the tokenisation also includes the addition of flags. These flags may be contextual, for instance, by denoting the start ("_START_") or end ("_END_") of the data. This helps to make certain features explicit, for instance, the start and end flags provide useful bigrams for the first and last words of input text.

The flags may also reduce the number of features to be processed by replacing certain types with flags. For instance, numbers may be replaced by the flag "_NUMBER_", URLs may be replaced with the flag "_URL_" and usernames, such as twitter usernames denoted by an @ symbol, may be replaced by the flag "_USERNAME_". A description of feature reduction (otherwise known as dimensionality reduction) can be found in Go, A.; Bhayani, R. & Huang, L. (2009), 'Twitter Sentiment Classification using Distant Supervision', Processing, 1-6, the entire disclosure of which is incorporated herein by reference.

The tokens are then grouped by an n-grammar 230 to form n-grams. n-grams are strings of n consecutive tokens. The types of n-grams are predefined and will depend on how the classifier was trained. In the present embodiment, a combination of n-grams up to length five are used. Accordingly, the n-grammar forms a number of n-grams from the tokens, from unigrams through to five-grams on the same tokens. A unigram is a single token whereas a bigram is a string of two consecutive tokens. As can be seen from Table 1, the bigrams are formed by grouping the first token with the second token, the second token with the third token, the third token with the fourth token, and continuing until the final token has been grouped into an n-gram. Accordingly, the set of bigrams contains every combination of consecutive tokens from the set of input tokens. This process is replicated and extended for each n-gram up to the five-gram. A description of n-gram formation can be found in Natural Language Processing for the Working Programmer" by Daniël de Kok and Harm Brouwer. 2010 (accessible at:

http://nlpwp.org/book/) the entire disclosure of which is incorporated herein by reference.

TABLE 1

Examples of the variables input and calculated during classification

| Type | Example |
|---|---|
| Raw string | "audi, a3 or a5 next year?! #decisions #newcar" |
| Tokens | [__START__, audi, a3, or, a5, next, year, #decisions, #newcar, __END__] |
| n-grams | [__START__, audi, a3, or, a5, next, year, #decisions, #newcar, __END__, __START__ audi, audi a3, a3 or, or a5, a5 next, next year, year #decisions, #decisions #newcar, #newcar__END__] |
| Vector | [(6568, 0.125), (1, 0.125), (39845, 0.125), . . . , (97437, 0.125)] |

The n-grams are then converted into a vector 240 according to the classifier. The present embodiment utilises a support vector machine (SVM); however, alternative methods of classifying n-grams may be used. Support vector classification is described in C.-W. Hsu, C.-C. Chang and C.-J. Lin. A Practical Guide to Support Vector Classification, Tech. rep., Department of Computer Science, National Taiwan University, https://www.csie.ntu.edu.tw/~cjlin/papers/guide/guide.pdf, the entire disclosure of which is incorporated herein by reference. The vector is an n-dimensional vector, where n is the total number of features (n-grams) across the entire training corpus. Each position in the vector corresponds with a unique feature. The value of a particular position in the vector may be a simple count of the frequency of that n-gram in the text, or the result of a weighting function such as term frequency—inverse document frequency (tf-idf). A discussion of vectors can be found in H. Liu and H. Motoda. Feature Selection for Knowledge Discovery and Data Mining, ISBN 079238198X, the entire disclosure of which is incorporated herein by reference.

The vector is then input into the support vector machine to determine which class the data belongs to 250. A binary classifier is used. Accordingly, the data must fall within one of two classes. The confidence of the data belonging to a first class is determined based on the vector. In the present embodiment, a support vector machine is used. The support vector machine used is the LIBLINEAR support vector machine (R.-E. Fan, K.-W. Chang, C.-J. Hsieh, X.-R. Wang, and C.-J. Lin. LIBLINEAR: A Library for Large Linear Classification, Journal of Machine Learning Research 9(2008), 1871-1874, the entire disclosure of which is incorporated herein by reference. Software available at http://www.csie.ntu.edu.tw/~cjlin/liblinear); however, any support vector machine, or any other method of classification, such as neural networks, may be used.

In the present embodiment, a confidence score of between −1 and 1 is assigned to the data, with 1 indicating a 100% confidence that the data belongs to the first class and −1 indicating a 0% confidence that the data belongs to the first class (therefore indicating a 100% confidence that the data belongs to the other class). Each confidence score indicates the confidence that the classification is correct.

If the absolute confidence value is greater than a predefined threshold, then the data is assigned to that class 270. If the absolute confidence value is less than the threshold then the data is assigned to the other class 260. The threshold shown in FIG. 1 is 0, with a positive confidence score resulting in the data being assigned to the first class and a negative confidence score resulting in the data being assigned to the other class. By increasing or decreasing the threshold, the user can vary the level of filtering between the classes. Appendix A provides examples of specific messages being classified and the thresholds and confidence scores (classifier value) assigned at each classification step.

The embodiment of FIG. 2 comprises tokenisation and n-gram formation included in the classification step 200. Accordingly, different methods of tokenisation and n-gram formation may be applied for each classification step. In alternative embodiments, one or more of the classification steps following the first classification step do not comprise tokenisation or n-gram formation and instead only comprise classification using the n-grams formed previously.

Figure 3:
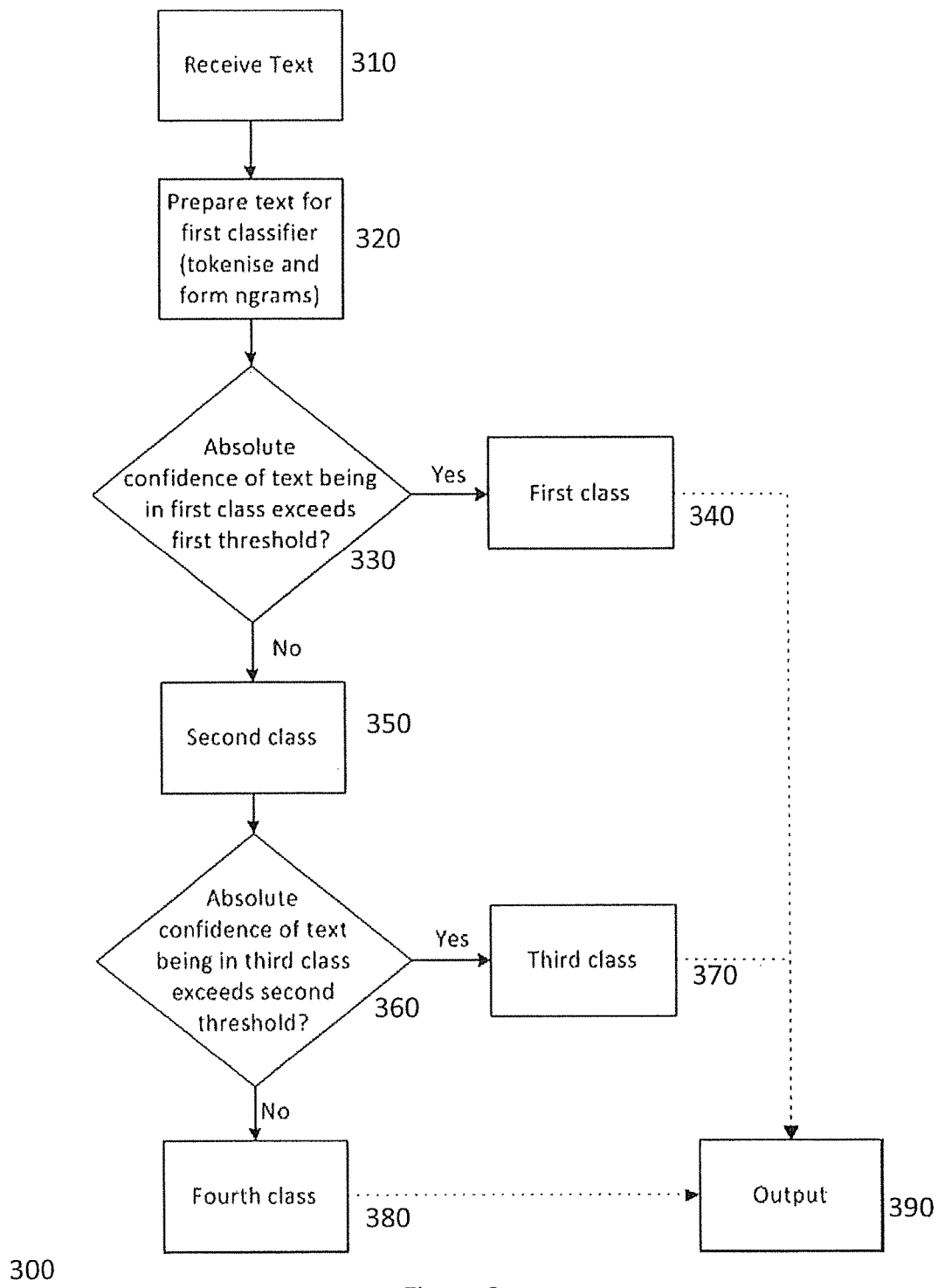
FIG. 3 shows a general method of classifying data according to an embodiment.

FIG. 3 shows a general method of classifying data according to an embodiment. This method 300 is a generalised version of that shown in FIG. 1 and implements a decision tree structure where pre-trained classifiers are chained together.

The system is pre-trained so that the rules for associating input data with the classes are predefined. Training is a known machine learning technique which uses a set of labelled (pre-classified) training data to determine the rules for classification. This will not only define the type of data associated with each class, but also the best method of inputting data (for instance, tokenising per character and using only unigrams; retokenising for each classification step; etc.). The classification rules are then stored so that they may be used to classify data. The training data may be labelled manually (by an annotator) or using distant supervision to automatically build the training data. The decision tree structure is predefined according to the specific classification requirements. Accordingly, this tree structure is input into the training system which trains the classifiers according to the structure.

Text to be classified is initially received 310. The text is then prepared for input into the first classifier 320. As discussed above, the text is tokenised and n-grams are formed. Flags may also be marked up in the text to include non-linguistic meaning units (for instance, start or end, numbers, currency, URLs, usernames, emoticons, hashtags, etc.). The methods of tokenisation (e.g. per word, per character) and the type of n-grams formed (e.g. unigram, bigram, etc.) are predefined according to the training of the system. A first classifier then determines the confidence of the text being in a first class and whether this confidence exceeds a first threshold 330. If the absolute confidence value exceeds the first threshold then the text is classified as being part of the first class 340.

If the absolute confidence value is less than or equal to the first threshold then the text is determined to be part of the second class 350 (i.e. not the first class) and is input into the second classifier 360. As the text has already been tokenised, the tokens from step 320 are used by the second classifier. The second classifier determines the confidence of the text being in a third class and whether this absolute confidence value exceeds a second threshold 360. If the absolute confidence value exceeds the second threshold then the text is classified as being part of the third class 370. If the absolute confidence value is less than or equal to the first threshold then the text is classified as being part of the fourth class 380. The data classified to the third and/or fourth classes may then be input into further classifiers.

Once the data has been classified (into one of the first, second third or fourth classes, or into a further class following additional classification steps), the classification is output 390. In one embodiment, the data is stored in a dictionary of classifier values. A list of data assigned to each class is stored in memory. Alternatively, the data may be stored along with a label indicating the assigned class. Furthermore, the determined classification may be output to a display, another device (e.g. via a network) or any other form of output. The results of the classification may be analysed by a user and used to retrain the classifiers.

As mentioned above, the first and second thresholds may be varied to alter the filtering strength without requiring the system to be retrained. In addition, by chaining classifiers together, each classifier may be made simpler. Each classifier need only consider its own linguistic domain. The second classifier only receives a message if it has been passed on by the first classifier. The second classifier therefore need not consider the linguistic domain of the first classifier.

A classifier that processes linguistic data (text) has the job (on its own) to identify the regularities of language, or the defining features of the language be it single worlds, phrases, characters, emoticons, hashtags, etc. A binary classifier (contrasted with a multiclass classifier) has two target classes to model. A trivial example (and one to contrast with) is sentiment analysis, which simply has to recognise patterns in very high level categories—this is simple enough to do with a single binary classifier.

By deploying multiple binary classifiers in this specific tree arrangement very high performance can be achieved on each classification step by restricting the feature domain in which each classifier operates. For text classification, the linguistic domains considered between each classifier may vary. For instance, in the embodiment of FIG. 1, the Consideration vs Lead Validation classifier 150 never needs to concern itself with the traits of language used by advertisers, or of customers in the Interest stage 145 (for example). In a specific example, URLs may not be considered by the Interest classifier 140, but may be important to the Advertising & Corporate Messaging classifier 120.

Whilst a binary classifier could be used that is Interest vs every other category in the tree, this would suffer from the exact problem described above—it would have to concern itself with the linguistic traits of all the classes rather than just its own two classes.

Moreover, by using multiple binary classifiers, the method is more adaptable. A multiclass classifier is not able to decouple the classification process from the interpretation of the classifier outputs. In contrast, the decision tree structure of the present embodiments allows the filtering thresholds to be altered in real-time. Moreover, this method is beneficial in multi-tenant environments which require different degrees of classification depending on the user. Using the decision tree approach described herein, the threshold for each classifier may be adapted to specific use cases can without needing to reclassify.

In addition, using multiple classifiers in sequence (as opposed to using a single multi-class classifier) allows the user to determine how closely associated the input data is with a given class, even if the data is not classified into that class. In one embodiment, the method comprises outputting the confidence of the data belonging to one or more of the classifiers. This may be output after each classification step, or after the data has been finally classified. The output may be storing and/or displaying the confidence level for one or more of the classes including any of the classes into which the data was not classified. In this way the user can interrogate the entire tree.

For example, a message that ends up being classified as relating to the Interest segment 145 shown in FIG. 1 will have to have passed through the entire tree to that point, that is, through categorisation steps 110, 120, 130 and 140. If a single multiclass classifier was used, it would not be possible to determine the confidence of the message belonging to the "Advertising & Corporate Messaging" class. This is because any confidence level would indicate the confidence of the data belonging to the "Interest" class vs. not belonging to the "Interest" class. There is no data relating to how the confidence of the data not belonging to the "Interest" class is divided up between the other classes.

With the system of the embodiment, each step tests a specific criterion, providing a binary result (albeit one associated with a confidence score) at each step. A user of the embodiment can consequently trace the decisions that have led to a particular message being classified in a particular manner back up the tree through the decisions made to see how strongly associated or disassociated a message was with a particular class (e.g. advertising, as in the above example). Accordingly, in one embodiment, the method comprises, for each classification step, outputting the confidence of the data falling in one or both of the associated classes of the respective classifier. This allows the user to determine how close to the thresholds data may be, and will therefore inform any alterations to the thresholds which the user may wish to implement.

Moreover, whilst FIG. 1 shows a single chain of classifiers, it is envisaged that the decision tree may have multiple branches of classifiers.

Figure 4:
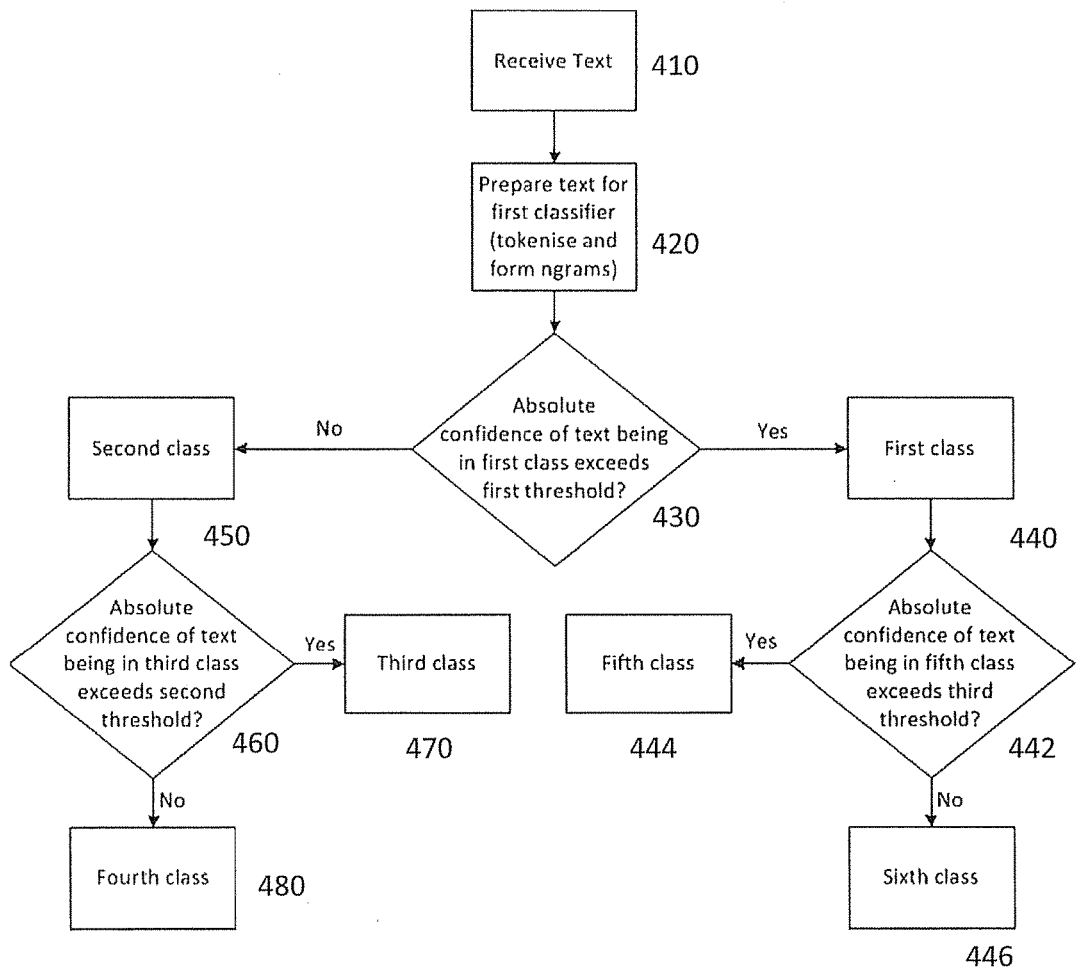
FIG. 4 shows a general method of classifying data comprising multiple branches of classifiers.

FIG. 4 shows a general method of classifying data comprising multiple branches of classifiers. In this embodiment, a third classifier is used. The method of FIG. 4 is the same as in FIG. 3 (with corresponding steps indicated by corresponding numbering); however, if the text is assigned to the first class then it is input into a third classifier 442. In addition, the output step has been excluded from FIG. 4 for clarity.

During the third classification step 442, the confidence of the text being in the fifth class is determined. If the absolute confidence value exceeds a third threshold 442 then the text is assigned to the fifth class 444. If the absolute confidence value doesn't exceed a third threshold then the text is assigned to the sixth class 446.

It is envisaged that any number of classifiers may be chained together as described herein to create decision trees which may be easily modified to the user's needs without requiring the classifiers to be retrained.

By utilising independent classifiers (that is classifiers that are independent from other classifiers that precede or follow them in a classification chain or tree), alternative methods of tokenisation may be implemented for each classification step. This allows each class to be more accurately classified. It may be that, in a particular language, a classifier for one pair of classes (such as Advertising vs Non-Advertising) performs best on single words, whereas the classifier for another set of classes (for instance, Interest vs Lead Validation) works best with phrases up to the length of three (for example). As multiple binary classifiers are utilised, each operating on their own task, the method may be adapted to exploit the configuration most suitable for that task. This can therefore provide a more accurate method of classifying data, as each classification step may have the format of its inputs (tokenisation and/or n-grams) optimised. A multiclass classifier would need the inputs all to be in the same format, thus restricting performance at each step.

Figure 5:
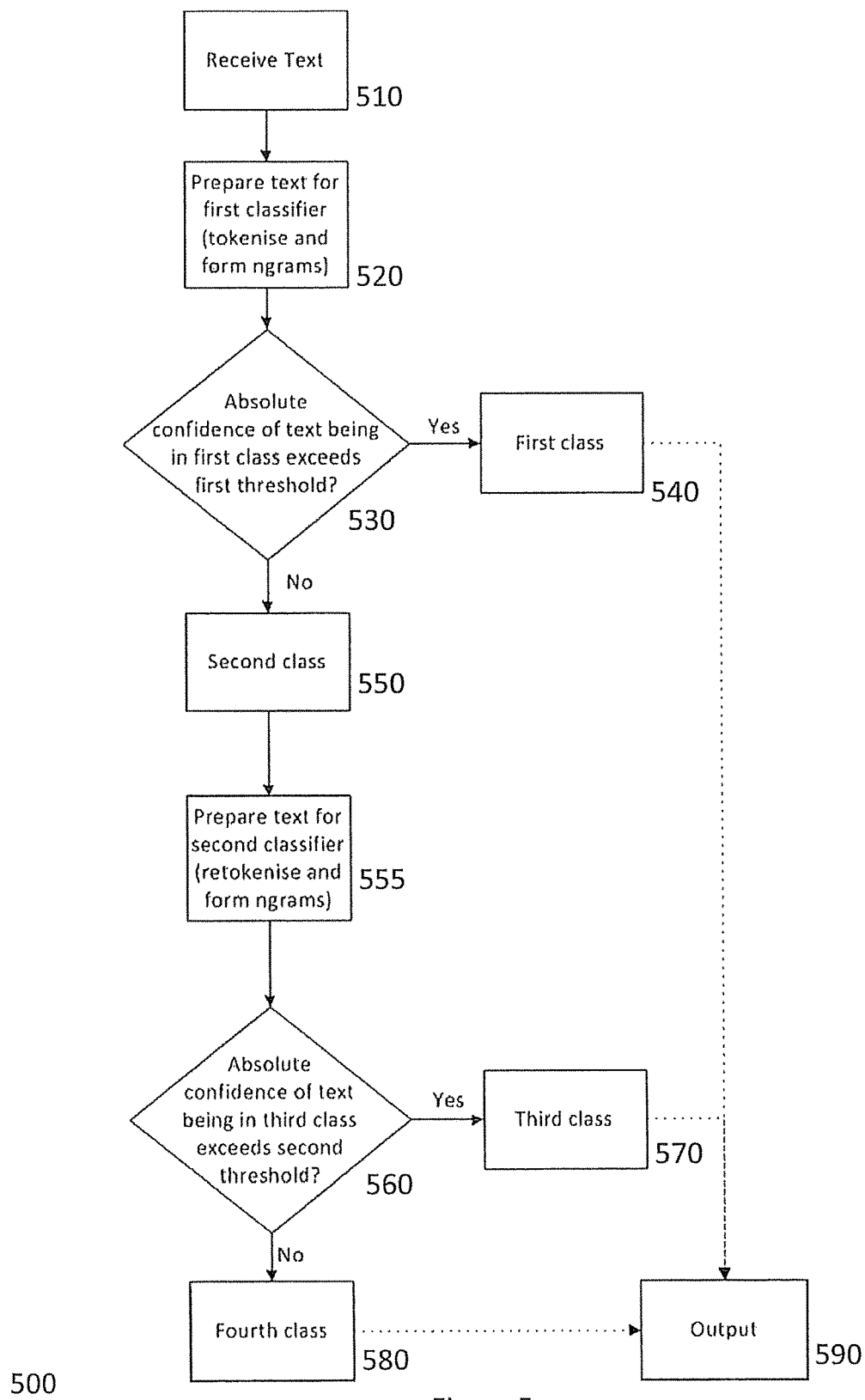
FIG. 5 shows a general method of classifying data wherein different tokenisation methods are used for each classification.

FIG. 5 shows a general method of classifying data wherein different tokenisation methods are used for each classification. The steps are the same as in FIG. 3 (with corresponding steps indicated by corresponding numbering); however, if the text is assigned to the second class then the inputs are adapted for the second classifier. The text is prepared again via tokenisation and the formation of n-grams 555; however, the type of tokens (e.g. character or word) and the type of n-grams (e.g. unigram, bigram, etc.) formed differs from those prepared for the first classifier. Moreover, the type of vectorisation differs between the first 520 and second 555 preparation steps, for instance, feature vectors of different dimensions and relating to different properties of the data may be prepared.

Utilising a second preparation step 555 allows the inputs to be adapted for each classifier to optimise the performance of each classifier. As before, further classifiers may be chained on to the classifiers shown in FIG. 5 with the preparation steps being varied for one or more of the further classifiers.

Whilst the above embodiment varies the tokenisation, the n-grams formed and the vectorisation between the two preparation steps, alternative embodiments may only vary one of these means of preparing the text.

Figure 6:
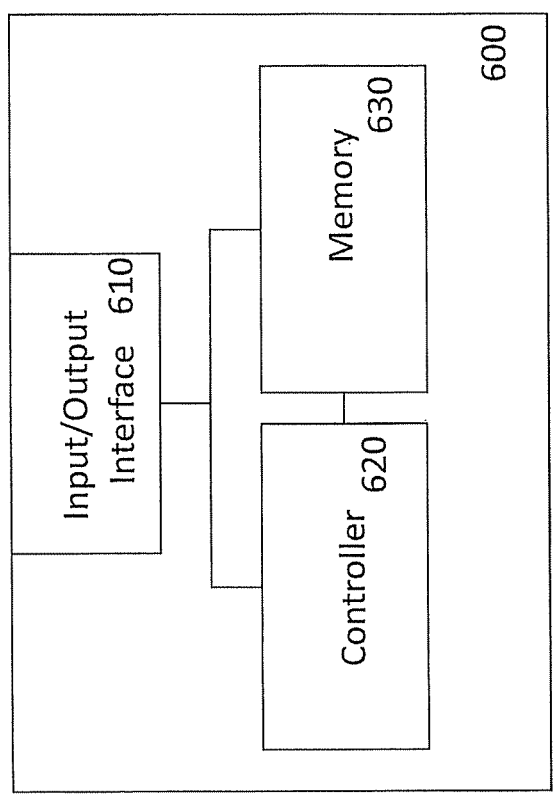
FIG. 6 shows a device for implementing the methods described herein.

FIG. 6 shows a device for implementing the methods described herein. The device 600 comprises an input/output interface 610, a controller 620 and memory 630. The input/output interface 610 is configured to receive data (such as text data) to be classified. The controller 620 is configured to implement the methods described herein to classify the received data and to either store the classification in memory 630 or to output it via the input/output interface 610. The memory 630 is configured to store computer executable code which, when executed by the controller 620, directs the controller 620 to perform the classification methods described herein.

The memory 630 is configured to store classifiers and the thresholds and rules for each classifier. The device 600 is configured to receive an updated threshold for one or more of the classifiers stored in the memory 630 and to apply the updated threshold(s) to data received at the input/output interface 610. The device 600 may be configured to be connected to a display and to cause the display to display a graphical user interface (GUI) via which the user may adjust the thresholds for the classifiers. The GUI may present a slider for each classifier to allow the user to define the threshold for each classifier and to increase or decrease the filtering strength for each classifier.

The memory 630 may be configured to store sets of predefined threshold values, each set comprising a predefined threshold value for each classifier. This allows the user to store predefined filter settings for specific use scenarios.

The above embodiments provide a more effective means of classifying data, wherein the thresholds for classification may be altered dynamically and in real-time without requiring the classifiers to be re-trained. As each classifier is independent, it only need consider the domain relating to its given classes, and may therefore avoid considering domains of other classifiers. This provides a more efficient means of classifying. In addition, the confidence of the input data meeting any of the possible classes may be output to provide the user with a better understanding of the features of the data and of how strong the classification is.

Whilst the above embodiments discuss classifying via support vector machines, alternative methods of classification may be used, provided that multiple classifiers are chained together as discussed above to provide a more dynamic method of filtering data. For instance, neural networks, naïve Bayes or maximum entropy may be utilised to classify the data. Moreover, a mixture of one or more of the above methods of classification may be used as each classification step is independent. Accordingly, alternative classification methods may be used at different points in the decision tree. This allows the most effective method of classification to be utilised at each stage.

Moreover, whilst the embodiments discuss classifying and storing the classification in one device, alternative embodiments receive data from a client over a network, classify the data according to the above methods, and send an indication of the classification for the data back to the client over the network. This allows the classification to be implemented on a central server with individual users accessing the server via client machines.

The above embodiments discuss classifying text. This text may be in any language, provided that the classifiers have been trained to that specific language. Embodiments are not limited to classifying text data and may classify any form of data (such as sounds, e.g., speech data).

Whilst the embodiments of FIGS. 3, 4 and 5 classify based on the confidence being greater than a threshold, alternative thresholds may be utilised, for instance, less than, less than or equal to, or greater than or equal to a specified threshold. Whilst embodiments relate to thresholds for the absolute confidence value, alternative embodiments utilise the confidence value without taking the modulus. Multiple thresholds may be set, including different regions, for instance, less than −0.3 or greater than +0.3.

The embodiments described above may be implemented in a device with any form of controller or processor capable of enacting the classification steps described. The invention is not limited to the specific embodiments described herein, and any controller may be implemented, including one operating according to software stored in the device, or one operating completely according to specifically designed hardware.

While certain embodiments have been described, the embodiments have been presented by way of example only, an area not intended to limit the scope of the inventions. Indeed, the novel methods and devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Appendix A: Worked Examples
Advertising Example
Note: Tokens. N-grams & Feature Vector are provided in Appendix B1.
Input Text: "The time to buy a new #Toyota is now! Save big during the #ToyotaTime Sales Event at #Huntington Toyota! . . . http://fb.me/4A9hxiJe6"
Sample Classifiers (with Conservative Thresholds):
Purchase vs Unrelated=0.1
Consumer vs Advertising & Corporate Messaging=0.15
Pre Purchase vs Post Purchase=0.0
Consideration/Lead Validation vs Interest=0.1
Consideration vs Lead Validation=0.0
Resulting Classification Values:
Purchase vs Unrelated=0.12699785729932156
Consumer vs Advertising & Corporate Messaging=−0.3928624900472825
Pre Purchase vs Post Purchase=0.25434369364939
Consideration/Lead Validation vs Interest=0.17337201175355507
Consideration vs Lead Validation=−0.10782316803621823

Resulting Classification (once the thresholds are applied to the classification values:
Advertising & Corporate Messaging (39.29%)
Explanation:
1. This message passed the first test 'Is it related to buying or not?'. The answer was yes, because the first classifier value of 0.12699785729932156 breached the threshold in the scenario defined to be 0.1. Traversal of the tree continued to the second classification step at which point the second classifier value of −0.3928624900472825 did not breach the threshold and so the message was classified as Advertising & Corporate Messaging.

Lead Validation Example
Note: Tokens, N-grams & Feature Vector are provided in Appendix 2
Input Text: "ready to buy this audi this week #a4"
Sample Classifiers (with Conservative Thresholds):
Purchase vs Unrelated=0.1
Consumer vs Advertising & Corporate Messaging=0.15
Pre Purchase vs Post Purchase=0.0
Consideration/Lead Validation vs Interest=0.1
Consideration vs Lead Validation=0.0
Resulting Classification Values:
Purchase vs Unrelated=0.2935946373878623
Consumer vs Advertising & Corporate Messaging=0.24617943303769393
Pre Purchase vs Post Purchase=0.5616935092090313
Consideration / Lead Validation vs Interest=0.5577777109561386
Consideration vs Lead Validation=−0.37859339000950964
Resulting Segment (once the thresholds are applied to the classification values):
Lead Validation (37.86%)
Explanation:
1. This message passed the first test 'Is it related to buying or not?'. The answer was yes, because the first classifier value of 0.2935946373878623 breached the threshold in the scenario defined to be 0.1. Traversal of the tree continued.
2. The message passed the second test 'Is this a consumer authored message?' because the value of 0.24617943303769393 breached the threshold in the scenario defined to be 0.15. Traversal of the tree continued.
3. The message passed the third test 'Is this a message about a purchase that is in the future?' because the classifier value of 0.5616935092090313 breached the 0.0 threshold defined in the scenario. Traversal of the tree continued.
4. The message is then somewhere on the path to purchase. It did not stop at the Interest stage because the value of 0.5577777109561386 breached the threshold defined in the scenario as 0.1.
5. The message was then placed into the Lead Validation segment on the final test.

Interest Example (Chinese)
Input Text: "我也想用三星的手机" ('I want to use a Samsung as well')
Sample Classifiers (with Conservative Thresholds):
Purchase vs Unrelated=0.1
Consumer vs Advertising & Corporate Messaging=0.15
Pre Purchase vs Post Purchase=0.0
Consideration/Lead Validation vs Interest=0.1
Consideration vs Lead Validation=0.0
Resulting Classification Values:
Purchase vs Unrelated=0.19288942699161854
Consumer vs Advertising & Corporate Messaging=0.4691388664718889
Pre Purchase vs Post Purchase=0.6114359421109689
Consideration/Lead Validation vs Interest=−0.36131634827638676
Consideration vs Lead Validation=−0.2942490216965478
Resulting Segment (once the thresholds are applied to the classification values):
Interest (36.13%)
Explanation:
1. This message passed the first test 'Is it related to buying or not?'. The answer was yes, because the first classifier value of 0.19288942699161854 breached the threshold in the scenario defined to be 0.1. Traversal of the tree continued.
2. The message passed the second test 'Is this a consumer authored message?' because the value of 0.4691388664718889 breached the threshold in the scenario defined to be 0.15. Traversal of the tree continued.
3. The message passed the third test 'Is this a message about a purchase that is in the future?' because the classifier value of 0.6114359421109689 breached the 0.0 threshold defined in the scenario. Traversal of the tree continued.
4. The message is then somewhere on the path to purchase. It stopped at the Interest stage because the value of −0.36131634827638676 did not breach the threshold defined in the scenario as 0.1. Traversal of the tree stopped and the message was placed into the Interest segment.

Appendix B1:
Tokens, N-grams and Feature Vector for sample Advertising Message
Text:
The time to buy a new #Toyota is now! Save big during the #ToyotaTime Sales Event at #HuntingtonToyota! . . . http://fb.me/4A9hxiJe6
Tokens:
[_START_, the, time, to, buy, a, new, #toyota, is, now, save, big, during, the, #toyotatime, sales, event, at, #huntingtontoyota, _URL_,_END_]
N-grams:
[_START_, the, time, to, buy, a, new, #toyota, is, now, save, big, during, the, #toyotatime, sales, event, at, #huntingtontoyota, _URL_, _END_, _START_ the, the time, time to, to buy, buy a, a new, new #toyota, #toyota is, is now, now save, save big, big during, during the, the #toyotatime, #toyotatime sales, sales event, event at, at #huntingtontoyota, #huntingtontoyota _URL_, _URL_ END_, _START_ the time, the time to, time to buy, to buy a, buy a new, a new #toyota, new #toyota is, #toyota is now, is now save, now save big, save big during, big during the, during the #toyotatime, the #toyotatime sales, #toyotatime sales event, sales event at, event at #huntingtontoyota, at #huntingtontoyota _URL_, #huntingtontoyota _URL__END_, _START_ the time to, the time to buy, time to buy a, to buy a new, buy a new #toyota, a new #toyota is, new #toyota is now, #toyota is now save, is now save big, now save big during, save big during the, big during the #toyotatime, during the #toyotatime sales, the #toyotatime sales event #toyotatime sales event at, sales event at #huntingtontoyota, event at #huntingtontoyota _URL_, at #huntingtontoyota _URL__END_, _START_ the time to buy, the time to buy a, time to buy a new, to buy a new #toyota, buy a new #toyota is, a new #toyota is now, new #toyota is now save, #toyota is now save big, is now save big during, now save big during the, save big during the #toyotatime, big during the #toyotatime sales, during the #toyotatime sales event, the #toyotatime sales event at, #toyotatime sales event at #huntingtontoyota, sales event at #huntingtontoyota _URL_, event at #huntingtontoyota _URL__END_]

Sparse Feature Vector:
{2065=0.05263157894736842,
1=0.05263157894736842,
6569=0.05263157894736842,
31151=0.05263157894736842,
548=0.05263157894736842,
206=0.05263157894736842,
35810=0.05263157894736842,
7=0.05263157894736842,
241021=0.05263157894736842,
890=0.05263157894736842,
157597=0.05263157894736842,
14274=0.05263157894736842,
7485=0.05263157894736842,
68213=0.05263157894736842,
144=0.05263157894736842,
340013=0.05263157894736842,
203856=0.05263157894736842,
237182=0.05263157894736842,
33=0.05263157894736842,
232=0.10526315789473684,
345511=0.05263157894736842,
141524=0.05263157894736842,
4925=0.05263157894736842,
270077=0.05263157894736842,
68225=0.05263157894736842,
76759=0.05263157894736842,
533=0.05263157894736842,
17053=0.05263157894736842,
666=0.05263157894736842,
35797=0.05263157894736842,
540=0.05263157894736842,
74252=0.05263157894736842,
656=0.05263157894736842,
776=0.05263157894736842,
78567=0.05263157894736842,
120=0.05263157894736842}

Appendix B2:
Tokens, N-grams and Feature Vector for sample Chinese Interest Message
Text:
我也想用三星的手机
Tokens:
[_START_, 我, 也, 想, 用, 三, 星, 的, 手, 机, _END_]
N-grams:
_START_, 我, 也, 想, 用, 三, 星, 的, 手, 机, _END_, _START_ 我,我也, 也想, 想用, 用 二,三星,星的,的手,手机,机 _END_,
_START_ 我也,我也想,也想用,想用三,用三 星,三星的,星的手,的手机,手机 _END_]

Sparse Feature Vector:
{1=0.1111111111111111,
408=0.1111111111111111,
128529=0.1111111111111111,
4=0.1111111111111111,
40908=0.1111111111111111,
708=0.1111111111111111,
9796=0.1111111111111111,
40953=0.1111111111111111,
3597=0.1111111111111111,
772=0.1111111111111111,
1716=0.1111111111111111,
111093=0.1111111111111111,
138913=0.1111111111111111,
561=0.1111111111111111,
1660=0.1111111111111111,
179759=0.1111111111111111,
2519=0.1111111111111111,
476845=0.1111111111111111,
55743=0.1111111111111111,
304671=0.1111111111111111,
1181=0.1111111111111111}

The invention claimed is:

1. A device for classifying data, the device comprising a controller configured to:
    receive data;
    prepare the data for input into a first machine learning classifier according to a first method;
    classify the data into a first class or a second class using the first machine learning classifier; and
    if the data is classified into the second class:
        prepare the data for input into a second machine learning classifier according to a second method; and
        classify the data into one of a third class and a fourth class using the second machine learning classifier,
    wherein the first and second machine learning classifiers have their own predefined sets of rules for classifying data, and
    wherein the first and second methods of preparing the data are different.

2. The device of claim 1 wherein the first and second machine learning classifiers are binary classifiers.

3. The device of claim 1 wherein the first and second machine learning classifiers classify the data based on traits of the data and wherein the second machine learning classifier does not consider some or all of the traits considered by the first machine learning classifier.

4. The device of claim 1 wherein the first and second machine learning classifiers utilise different methods of classifying the data.

5. The device of claim 1 wherein:
    classifying the data into the first class or the second class using the first machine learning classifier comprises:
        determining the confidence that the data belongs to the first class based on the set of rules of the first machine learning classifier;
        if the confidence that the data belongs to the first class falls within a first range, classifying the data into the first class; and
        if the confidence that the data belongs to the first class does not fall within the first range, classifying the data into the second class; and
    classifying the data into the third class or the fourth class using the second machine learning classifier comprises:
        determining the confidence that the data belongs to the second class based on the set of rules of the second machine learning classifier;
        if the confidence that the data belongs to the third class falls within a second range, classifying the data into the third class; and
        if the confidence that the data belongs to the third class does not fall within the second range, classifying the data into the fourth class.

6. The device of claim 5 wherein the controller is further configured to alter one or more of the first and second ranges and classify further data according to the updated one or more of the first and second ranges.

7. The device of claim 5 wherein the controller is further configured to output one or more of the determined confidences.

8. The device of claim 1 wherein the first and second methods of preparing the data comprise different methods of tokenising the data.

9. The device of claim 1 wherein the first and second methods of preparing the data comprise different methods of forming n-grams from the data.

10. The device of claim 1 wherein the first and second methods of preparing the data comprise forming respective feature vectors from the data and the first and second methods comprise different methods of vectorising the data.

11. A method of classifying data, the method being implemented by a device comprising a controller, the controller configured to perform the method comprising:
   receiving data;
   preparing the data for input into a first machine learning classifier according to a first method;
   classifying the data into a first class or a second class using the first machine learning classifier; and
   if the data is classified into the second class:
      preparing the data for input into a second machine learning classifier according to a second method; and
      classifying the data into one of a third class and a fourth class using the second machine learning classifier,
   wherein the first and second machine learning classifiers have their own predefined sets of rules for classifying data, and
   wherein the first and second methods are different.

12. The method of claim 11 wherein the first and second machine learning classifiers are binary classifiers.

13. The method of claim 11 wherein the first and second machine learning classifiers classify the data based on traits of the data and wherein the second machine learning classifier does not consider some or all of the traits considered by the first machine learning classifier.

14. The method of claim 11 wherein the first and second machine learning classifiers utilise different methods of classifying the data.

15. The method according to claim 11 wherein:
classifying the data into the first class or the second class using the first machine learning classifier comprises:
   determining a confidence that the data belongs to the first class based on the set of rules of the first machine learning classifier;
   if the confidence that the data belongs to the first class falls within a first range, classifying the data into the first class; and
   if the confidence that the data belongs to the first class does not fall within the first range, classifying the data into the second class; and
classifying the data into the third class or the fourth class using the second machine learning classifier comprises:
   determining a confidence that the data belongs to the second class based on the set of rules of the second machine learning classifier;
   if the confidence that the data belongs to the third class falls within a second range, classifying the data into the third class; and
   if the confidence that the data belongs to the third class does not fall within second range, classifying the data into the fourth class.

16. The method of claim 15 further comprising, altering one or more of the first and second ranges and classifying further data according to the updated one or more of the first and second ranges.

17. The method of claim 15 further comprising outputting one or more of the determined confidences.

18. The method according to claim 11 wherein the first and second methods comprise different methods of tokenising the data.

19. The method according to claim 11 wherein the first and second methods comprise different methods of forming n-grams from the data.

20. The device of claim 11 wherein the first and second methods comprise forming respective feature vectors from the data and the first and second methods comprise different methods of vectorising the data.

21. A non-transitory computer readable medium containing program instructions for causing a computer to perform the method of claim 11.

* * * * *